(12) United States Patent
Aoki et al.

(10) Patent No.: US 10,436,248 B2
(45) Date of Patent: Oct. 8, 2019

(54) MOTION GUIDE DEVICE

(71) Applicant: THK CO., LTD., Tokyo (JP)

(72) Inventors: Shinji Aoki, Tokyo (JP); Hiroki Irikawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/781,964

(22) PCT Filed: Dec. 1, 2016

(86) PCT No.: PCT/JP2016/085731
§ 371 (c)(1),
(2) Date: Jun. 6, 2018

(87) PCT Pub. No.: WO2017/104428
PCT Pub. Date: Jun. 22, 2017

(65) Prior Publication Data
US 2018/0355915 A1    Dec. 13, 2018

(30) Foreign Application Priority Data

Dec. 15, 2015  (JP) .................................. 2015-244324

(51) Int. Cl.
  *F16C 29/06* (2006.01)
  *F16C 33/38* (2006.01)
  *F16C 33/50* (2006.01)

(52) U.S. Cl.
  CPC .......... *F16C 29/06* (2013.01); *F16C 29/0623* (2013.01); *F16C 29/0645* (2013.01);
  (Continued)

(58) Field of Classification Search
  CPC .. F16C 29/06; F16C 29/0633; F16C 29/0635; F16C 29/0638; F16C 29/0642;
  (Continued)

(56) References Cited

U.S. PATENT DOCUMENTS 6,155,718 A    12/2000    Takamatsu et al.
7,736,060 B2 *  6/2010   Matsumoto ......... F16C 29/0609
                                                     384/44

(Continued)

FOREIGN PATENT DOCUMENTS

JP    5-52217 A     3/1993
JP    11-2241 A    1/1999

(Continued)

OTHER PUBLICATIONS

Translatoin of JP2008-185045 obtained Jul. 24, 2019.*

(Continued)

*Primary Examiner* — James Pilkington
(74) *Attorney, Agent, or Firm* — Westerman, Hattori, Daniels & Adrian, LLP

(57) ABSTRACT

Provided is a motion guide device, which includes: a track rail; rolling elements; a moving block, which has an endless circulation path; and a holding belt having pockets, wherein the holding belt has a pair of end portions opposed to each other through intermediation of a free rolling element in the endless circulation path, and wherein a condition of $(X-Y) \times Z > (B+C) - A > 0$ is satisfied, where: A represents a path length of the endless circulation path; B represents a total length of the holding belt; C represents a diameter of the free rolling element; X represents a diameter of each of the pockets; Y represents a diameter of each of the rolling elements; and Z represents the number of the rolling elements arrayed in the holding belt.

4 Claims, 3 Drawing Sheets

(52) U.S. Cl.
CPC .......... *F16C 29/0666* (2013.01); *F16C 33/38* (2013.01); *F16C 33/3825* (2013.01); *F16C 33/3887* (2013.01); *F16C 33/506* (2013.01); *F16C 2240/44* (2013.01); *F16C 2240/70* (2013.01)

(58) Field of Classification Search
CPC .. F16C 29/0645; F16C 33/38; F16C 33/3825; F16C 29/0623; F16C 29/0666
See application file for complete search history.

(56) References Cited

U.S. PATENT DOCUMENTS

| | | | | |
|---|---|---|---|---|
| 8,408,796 | B1* | 4/2013 | Hsu | F16C 33/3825 384/45 |
| 2008/0085067 | A1* | 4/2008 | Hsu | F16C 29/0609 384/45 |

FOREIGN PATENT DOCUMENTS

| | | | |
|---|---|---|---|
| JP | 3243415 | B2 | 1/2002 |
| JP | 2007-154905 | A | 6/2007 |
| JP | 2008-185045 | A | 8/2008 |
| WO | 2010/074155 | A1 | 7/2010 |

OTHER PUBLICATIONS

International Search Report dated Feb. 21, 2017, issued in counterpart International Application No. PCT/JP2016/085731 (2 pages).

* cited by examiner

MOTION GUIDE DEVICE

CROSS-REFERENCE TO RELATED APPLICATIONS

This application is a National Stage entry of International Patent Application No. PCT/JP016/085731, filed on Dec. 1, 2016, and claims priority to Japanese Application No. 2015-244324, filed on Dec. 15, 2015, the entirety of both of which are herein incorporated by reference.

TECHNICAL FIELD

The present invention relates to a motion guide device, which is configured to freely guide a work table of a machine tool or tables of various conveying devices along a track rail.

BACKGROUND ART

As a motion guide device of this type, there has been known a motion guide device disclosed in Patent Literature 1. This motion guide device includes a track rail and a moving block. The track rail is laid on a fixed portion such as a bed. The moving block is freely movable along the track rail, and is capable of fixing a movable body such as a table being an object to be guided. The moving block is assembled to the track rail through intermediation of a plurality of rolling elements such as balls or rollers. A rolling surface for the rolling elements is formed on the track rail along a longitudinal direction of the track rail. The moving block has a rolling surface for the rolling elements, which is opposed to the rolling surface of the track rail. Further, the moving block has an endless circulation path for allowing the rolling elements to circulate from one end to another end of the rolling surface. Circulation of the rolling elements in the endless circulation path enables the moving block to freely move along the track rail.

Further, a holding belt which is configured to hold the rolling elements at constant intervals is incorporated into the endless circulation path together with the rolling elements. The holding belt is molded from a material having flexibility such as synthetic resin, and pockets configured to receive the rolling elements are arrayed at constant intervals in the holding belt. Further, the holding belt has a total length which is set smaller than a path length of the endless circulation path. Mien the holding belt is incorporated into the endless circulation path, both end portions of the holding belt are opposed to each other with an interval therebetween in the endless circulation path. The rolling elements roll on the rolling surface of the track rail and the rolling surface of the moving block while rotating in the pockets of the holding belt. As the balls circulate in the endless circulation path, the holding belt also circulates in the endless circulation path.

The endless circulation path for the rolling elements in the moving block includes a load path, a return path formed parallel to the load path, and a pair of direction change paths connecting end portions of the load path and the return path to each other. The load path is a region in which the rolling surface of the track rail and the rolling surface of the moving block are opposed to each other. The rolling elements roll in the load path while bearing a load between the track rail and the moving block. Meanwhile, the return path and the pair of direction change paths are no-load paths for returning the rolling elements from a termination end to a start end of the load path. In the no-load paths, the rolling elements do not bear any load.

Therefore, when a relative motion occurs between the track rail and the moving block, the rolling elements in the load path are forcibly caused to roll and proceed in the path. However, the rolling elements in the return path and the pair of direction change paths do not roll themselves, and are pulled or pushed by the rolling elements in the load path through intermediation of the holding belt to proceed in the return path and the pair of direction change paths.

CITATION LIST

Patent Literature

[PTL 1] JP 3243415 B2

DISCLOSURE OF THE INVENTION

Problem to be Solved by the Invention

As mentioned above, the holding belt is incorporated into the endless circulation path under the state in which the both end portions of the holding belt are opposed to each other. Thus, due to such movement of the rolling elements in the endless circulation path, a tensile force along a circulation direction repeatedly acts on the holding belt when the end portions of the holding belt enter or leave the load path. Due to such action, there is a fear in that a part of the holding belt is strongly rubbed against a belt guide groove formed in the direction change paths, with the result that uneven wear is promoted.

Means for Solving the Problems

The present invention has been made in view of the above-mentioned problems, and has an object to provide a motion guide device, which alleviates a tensile force acting on a holding belt when the holding belt circulates in an endless circulation path together with rolling elements, thereby being capable of preventing uneven wear of the holding belt.

Specifically, according to one embodiment of the present invention, there is provided a motion guide device, including: a track rail; a large number of rolling elements configured to roll on the track rail; a moving block, which includes an endless circulation path for the rolling elements, and is configured to freely move along the track rail; and a holding belt having pockets, which are arrayed at predetermined intervals, and are configured to receive the rolling elements, is incorporated into the endless circulation path, and is configured to move in the endless circulation path together with the rolling elements, wherein the holding belt has a pair of end portions opposed to each other through intermediation of a free rolling element in the endless circulation path, and wherein a condition of $(X-Y) \times Z > (B+C) - A > 0$ is satisfied, where: A represents a path length of the endless circulation path; B represents a total length of the holding belt; C represents a diameter of the free rolling element; X represents a diameter of each of the pockets; Y represents a diameter of each of the rolling elements; and Z represents the number of the rolling element arrayed in the holding belt.

Effects of the Invention

According to the present invention, the holding belt is incorporated into the endless circulation path under the state in which the holding belt is compressed in the longitudinal direction. Thus, the both end portions of the holding belt always push each other through intermediation of the free rolling element, and hence the tensile force acting on the holding belt along with circulation of the holding belt is alleviated, thereby being capable of preventing uneven wear of the holding belt.

MODE FOR CARRYING OUT THE INVENTION

Now, detailed description is made of a motion guide device according to one embodiment of the present invention with reference to the accompanying drawings.

Figure 1:
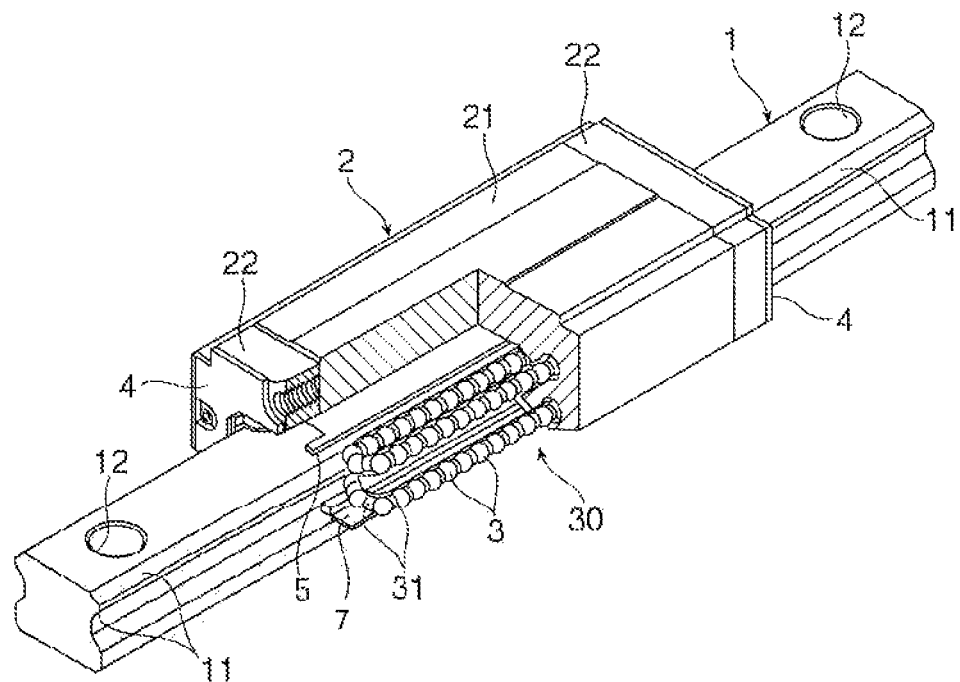
FIG. 1 is a perspective view for illustrating an example of embodiments of a motion guide device to which the present invention is applied.

FIG. 1 is a perspective view for illustrating an example of a motion guide device to which the present invention is applicable. The motion guide device includes a track rail 1 and a moving block 2. The track rail 1 extends linearly. The moving block 2 is assembled to the track rail 1 through intermediation of a large number of balls 3 being rolling elements. The track rail 1 is laid on a fixed portion, and a movable body of a type among various types is mounted to the moving block 2, thereby being capable of guiding the movable body along the track rail 1 in a freely reciprocable manner.

The track rail 1 is formed into an elongated body having a substantially rectangular cross section. The track rail 1 has a plurality of bolt mounting holes 12, which are arrayed at predetermined intervals in a longitudinal direction and each penetrate from an upper surface to a bottom surface. With use of fixing bolts inserted into the bolt mounting holes 12, the track rail 1 can be rigidly fixed to a fixing portion such as a bed or a column. On both right and left side surfaces of the track rail 1, there are formed protruding portions each extending along the longitudinal direction. On each of an upper portion and a lower portion of the protruding portion, there is formed one rolling surface 11 for balls. The track rail has four rolling surfaces 11 as a whole. The number of rolling surfaces 11 formed on the track rail 1 is not limited to four.

Meanwhile, the sieving block 2 mainly includes a block main body 21 made of metal and a pair of end plates 22 made of synthetic resin. The pair of end plates 22 are mounted to both ends of the block main body 21 in a moving direction of the block main body 21. The moving block 2 has a plurality of endless circulation paths for the balls 3 so as to correspond to the rolling surfaces 11 of the track rail. The endless circulation paths are brought to completion by fixing the pair of end plates to the both ends of the moving block 2. A flexible holding belt 30 is incorporated into each endless circulation path, and a large number of balls 3 are arrayed in a single row in the holding belt 30. Thus, when the moving block 2 is moved in the longitudinal direction of the track rail 1, and the balls 3 roll on the rolling surfaces of the track rail 1, the holding belts 30 circulate in the endless circulation paths together with the balls 3.

Further, various seal members 4, 5, and 7, which are configured to seal gaps between the moving block and the track rail are fixed to the moving block, thereby preventing dust or the like adhering to the track rail 1 from enter in a the endless circulation paths. In the illustration of the moving block 2 in FIG. 1, one-fourth of the entirety of the moving block 2 is cut out so that the presence of the balls 3 and the holding belts 30 in the endless circulation path can be recognized.

Figure 2:
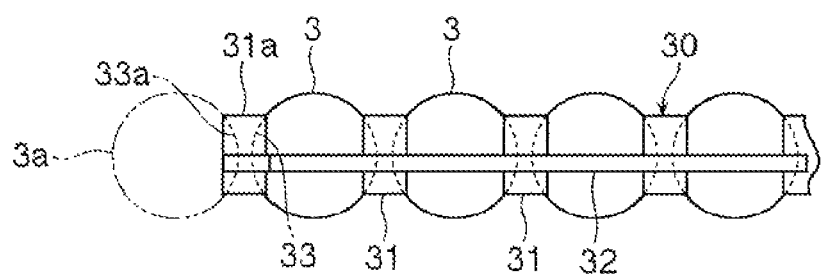
FIG. 2 is a side view for illustrating an example of a holding belt which is usable for the motion guide device illustrated in FIG. 1.
Figure 3:
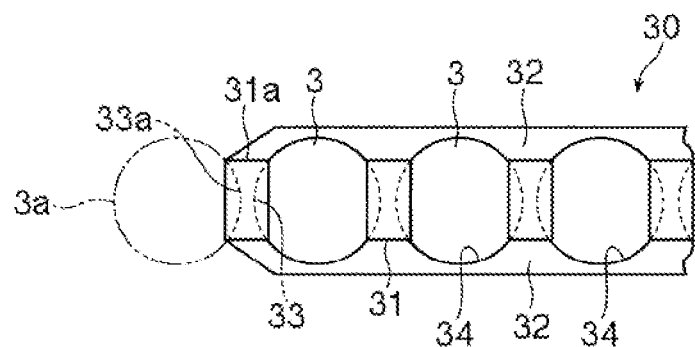
FIG. 3 is a plan view for illustrating the holding belt illustrated in FIG. 2.

FIG. 2 an FIG. 3 are illustrations of part of the holding belt 30 in which the balls 3 are arrayed, and include an end portion of the holding belt 30 in the longitudinal direction. The holding belt 30 includes a plurality of spacer portions 31 and a pair of coupling belt portions 32. The plurality of spacer portions 31 are arrayed in a single row at constant intervals. The pair of coupling belt portions 32 is configured to couple the spacer portions 31 to each other. The spacer portions and the coupling belt portions are manufactured by injection molding using synthetic resin. The holding belt 30 has flexibility as mentioned above. When the holding belt 30 circulates in the endless circulation path together with the balls 3, the holding belt 30 is repeatedly extended and curved. At this time, the flexibility is imparted mainly by the coupling belt portions 32, and the coupling belt portions 32 can be flexed more freely than the spacer portions 31.

Each spacer portion 31 has concave seats 33 each having a curvature approximate to that of a spherical surface of the ball 3, and a space between spacer portions which are adjacent to each other defines a pocket 34 for receiving the ball. Further, terminal end spacer portions 31a provided at end portions of the holding belt 30 each are also formed into the same shape as other spacer portions 31. In the endless circulation path, a free ball 3a to be described later is brought into slide contact with concave seats 33a of the terminal end spacer portions 31a.

Figure 4:
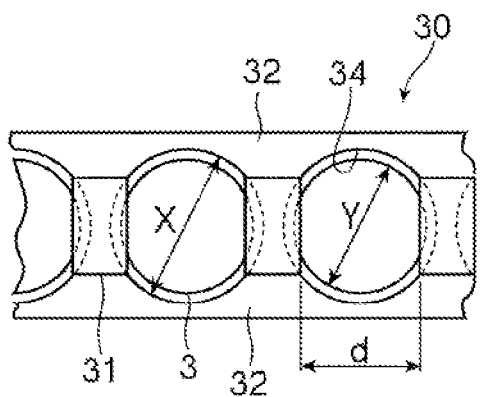
FIG. 4 is an enlarged view for illustrating a gap between a pocket of a holding belt and the ball illustrated in FIG. 2.

As illustrated in FIG. 4, a diameter X of each of the pockets 34, which are formed in the holding belt 30 and configured to receive the balls 3, is set so as to be slightly larger than a diameter Y of each of the balls 3. However, a distance "d" between spacer portions 31 which are adjacent to each other is set so as to be smaller than the diameter Y of each of the balls 3. Thus, the ball 3 received in the pocket 34 is prevented from dropping off from a space between the spacer portions 31 provided on both sides of the ball 3.

In the embodiment of the present invention described above with reference to FIG. 2 to FIG. 4, balls are used as rolling elements. However, the rolling elements may foe rollers. In such a case, the concave seats 33 formed in the spacer portion 31 are concave seats each having a curvature approximate to that of an outer peripheral surface of the roller. Further, the concave seats 33 formed in the spacer portion 31 are not essentially required. In view of avoiding direct contact between the rolling elements, the spacer portions 31 may each be a spacer portion simply having a plate shape.

Figure 5:
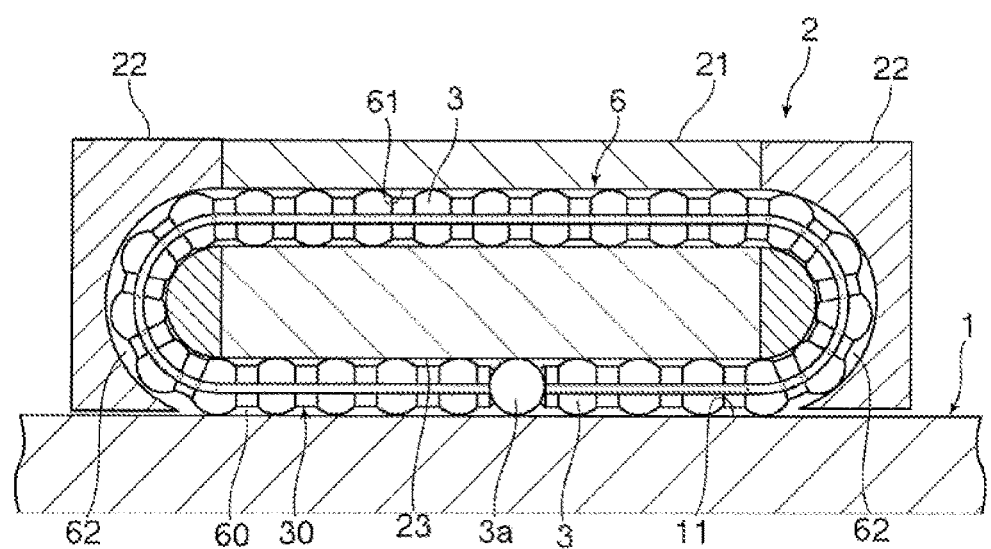
FIG. 5 is a sectional view for schematically illustrating a configuration of an endless circulation path of the motion guide device illustrated in FIG. 1.

FIG. 5 is a sectional view for illustrating the endless circulation path 6. The endless circulation path 6 includes a load path 60, a return path 61, and a pair of direction change paths 62. The block main body 21 forming the moving block 2 has a rolling surface 23 opposed to the rolling surface 11 of the track rail 1. The balls 3 roll while bearing a load between the rolling surface 11 of the track rail 1 and the rolling surface 23 of the block main body 21. In the endless circulation path 6, a path portion in which the balls 3 roll while bearing the load corresponds to the load path 60.

Further, the block main body 21 has the return path 61 extending parallel to the load path 60. Typically, the return path 61 is formed so as to penetrate through the block main body 21, and an inner diameter of the return path 61 is set so as to be slightly larger than a diameter of the ball 3. Meanwhile, the pair of direction change paths 62 is provided on both sides of the load path 60 in the longitudinal direction, and connects end portions of the load path 60 and end portions of the return path 61 to each other. The direction change paths 62 are formed in the end plates 22, respectively. When the pair of end plates 22 is fixed at predetermined positions at both ends of the block main body 21, the direction change paths 62 connect the load path 60 and the return path 61 to each other, thereby bringing the endless circulation path 6 capable of allowing circulation of the balls 3 to completion.

The holding belt having the balls 3 received in the pockets 34 is incorporated into the endless circulation path 6. Both end portions of the holding belt 30 are opposed to each other in the endless circulation path 6, and a ball (hereinafter referred to as "free ball") 3a which is not received in the pocket 34 is arranged between the end portions of the holding belt 30. The free ball 3a is the same as the balls 3 arrayed in the pockets 34 of the holding belt 30, and bears the load between the track rail 1 and the block main body similarly to other balls 3. Further, a spherical surface of the free ball 3a is held in abutment against concave seats 33a of the terminal end spacer portions 31a of the holding belt. Thus, in the endless circulation path 6, a large number of balls 3 are arrayed at constant intervals each corresponding to a thickness of the spacer portion 31.

In order to allow the free ball 3a to be always held in contact with the concave seats 33a of the terminal end spacer portions 31a, a path length A of the endless circulation path 6 is set so as to be smaller than a sum of a total length B of the holding belt 30 and a diameter C of the free ball 3a. That is, the relationship of (B+C)>A is satisfied. The path length of the endless circulation path 6 refers to a length of one track formed by a locus of centers of the balls 3 in the endless circulation path. Further, the total length B of the holding belt 30 refers to, when the terminal end spacer portions 31a have concave seats 33a held in contact with the free ball 3a, a distance from a deepest portion of the concave seat 33a formed at one end of the holding belt to a deepest portion of the concave seat 33a formed at another end of the holding belt.

Thus, when the expression of $\delta=(B+C)-A>0$ is satisfied, the holding belt 30 is incorporated into the endless circulation path 6 under a state in which the holding belt 30 is compressed in the longitudinal direction thereof. Thus, the pair of terminal end spacer portions 31a provided at both ends of the holding belt 30 is always held in contact with the free ball 3a.

Meanwhile, in order to incorporate the holding belt 30 and the free ball 3a into the endless circulation path 6, it is required that the total length of the holding belt 30 be reduced in the longitudinal direction by the above-mentioned length δ. In relation to this point, the diameter X of each of the pockets 34 of the holding belt 30 is set so as to be larger than the diameter Y of each of the balls 3 received in the pockets 34, and hence a gap (X−Y) is present between the ball 3 received in the pocket 34 and the spacer portion 31. Thus, the holding belt 30 can be compressed without involving an excessive force by eliminating the gap. At this time, each of the coupling belt portions 32 is slightly compressed and flexed.

When the total number of the balls 3 arrayed in the holding belt 30 is Z, and the holding belt 30 is compressed so as to eliminate the gap between each ball 3 and the spacer portion 31, a maximum amount is expressed by $\delta_{max}=(X-Y)Z$. That is, the total length of the holding belt 30 can be reduced by up to the maximum amount $\delta_{max}$ in the longitudinal direction without squeezing of the spacer portion 31 and involving an excessive force.

As is clear from the description above, when the path length A of the endless circulation path 6, the total length B of the holding belt 30, the diameter C of the free ball 3a, the diameter X of each of the pockets 34 of the holding belt 30, the diameter Y of each of the balls 3, and the total number Z of the balls 3 arrayed in the holding belt 30 are set so as to satisfy the condition of (X−Y)×Z>(B+C)−A>0, the terminal end spacer portions 31a of the holding belt 30 can always foe held in press-contact with the free ball 3a while sandwiching one free ball 3a between the both end portions of the holding belt 30 incorporated into the endless circulation path 6.

When the holding belt 30 circulates in one direction in the endless circulation path 6 together with the balls 3, the holding belt 30 is moved by the balls 3 rolling in the load path 60. Thus, a large tensile force acts on the holding belt 30 in accordance with positions of the both end portions of the holding belt 30 in the endless circulation path 6.

In that case, when the holding belt 30 and the free ball 3a are incorporated into the endless circulation path 6 so as to satisfy the above-mentioned condition, a leading end of the holding belt 30 in the circulation direction of the holding belt 30 in the endless circulation path 6 always presses a trailing end of the holding belt 30. Thus, the change in tensile force acting on the holding belt 30 can be alleviated, thereby being capable of preventing uneven wear of the holding belt 30 in the endless circulation path 6.

The present invention is applicable not only to a motion guide device including balls as rolling elements but also to a motion guide device including rollers as rolling elements. Further, the motion guide device described in detail with reference to FIG. 1 is merely an example, and the shape of the motion guide device to which the present invention is applicable is not limited to that of the motion guide device described above.

The invention claimed is:

1. A motion guide device, comprising:
   a track rail;
   a plurality of rolling elements configured to roll on the track rail;
   a moving block, which has an endless circulation path for the rolling elements, the moving block being configured to freely move along the track rail; and
   a compressible holding belt having pockets, the pockets being arrayed at predetermined intervals and being configured to receive the rolling elements, the holding belt capable of being incorporated into the endless circulation path, the holding belt being configured to move in the endless circulation path together with the rolling elements,
   wherein the holding belt has a pair of end portions opposed to each other through intermediation of a free rolling element in the endless circulation path, and
   wherein a condition of (X−Y)×Z>(B+C)−A>0 is satisfied, where:
   A represents a path length of the endless circulation path, the path length corresponding to a length of one track formed by a locus of centers of the plurality of rolling elements and the free rolling element when disposed in the endless circulation path;

B represents a total length of the holding belt when not disposed in the endless circulation path;

C represents a diameter of the free rolling element;

X represents a diameter of each of the pockets;

Y represents a diameter of each of the rolling elements; and

Z represents the number of the rolling elements arrayed in the holding belt.

2. The motion guide device according to claim 1, wherein the holding belt includes:
   a plurality of spacer portions arrayed in a single row at constant intervals; and
   a pair of coupling belt portions, the pair of coupling belt portions being configured to couple the spacer portions to each other, the pair of coupling belt portions having flexibility, and wherein the pockets for the rolling elements each are defined between a pair of spacer portions which are adjacent to each other.

3. The motion guide device according to claim 2, wherein the spacer portions each have concave seats capable of contacting the rolling elements, and
wherein terminal end spacer portions provided at end portions of the holding belt each have a concave seat capable of contacting the free rolling element.

4. The motion guide device according to claim 1,
wherein the free rolling element has a diameter which is equal to a diameter of the rolling elements received in the pockets of the holding belt, and
wherein the free rolling element is configured to bear a load between the track rail and the moving block.

* * * * *